United States Patent [19]

Gross

[11] 3,972,903

[45] Aug. 3, 1976

[54] MOLECULAR WEIGHT CONTROL IN CHARGE-TRANSFER COPOLYMERIZATION

[75] Inventor: James Richard Gross, Lake Jackson, Tex.

[73] Assignee: The Dow Chemical Company, Midland, Mich.

[22] Filed: July 26, 1974

[21] Appl. No.: 492,317

Related U.S. Application Data

[63] Continuation-in-part of Ser. No. 317,114, Dec. 21, 1972, abandoned.

[52] U.S. Cl. .................. 260/346.8 R; 260/501.1; 260/537 R; 260/533 R; 526/208; 526/210; 526/217; 526/317; 526/348; 526/349
[51] Int. Cl.² .................................. C08F 222/06
[58] Field of Search ............... 260/346.8 R, 78.5 R, 260/537 R, 533 R

[56] References Cited

UNITED STATES PATENTS

| | | | |
|---|---|---|---|
| 2,286,062 | 6/1942 | Cando et al. | 260/78.5 R |
| 2,599,119 | 6/1952 | McQueen | 260/78.5 R |
| 2,872,436 | 2/1959 | Hibbard | 260/78.5 R |
| 2,913,437 | 11/1959 | Johnson | 260/78.5 R |
| 3,404,135 | 10/1968 | Tietz | 260/78.5 R |
| 3,706,704 | 12/1972 | Heilman | 260/78.5 R |

FOREIGN PATENTS OR APPLICATIONS

1,930,217   12/1970   Germany

*Primary Examiner*—Lorraine A. Weinberger
*Assistant Examiner*—Michael Shippen
*Attorney, Agent, or Firm*—Benjamin G. Colley

[57] ABSTRACT

Process for controlling the molecular weight of alternating copolymers of electron rich, i.e. ethylene and electron deficient, i.e. maleic acid monomers wherein the radical initiated polymerization takes place in a primary solvent and a secondary solvent is added to modify the molecular weight.

3 Claims, No Drawings

MOLECULAR WEIGHT CONTROL IN CHARGE-TRANSFER COPOLYMERIZATION

CROSS REFERENCE TO RELATED APPLICATION

This application is a continuation-in-part of Ser. No. 317,114, filed December 21, 1972 now abandoned.

BACKGROUND OF THE INVENTION

This invention relates to a process for controlling the molecular weight of alternating copolymers which polymerize through radical initiation of charge transfer complexes of the electron rich and electron deficient comonomers using a combination of solvents to either raise or lower the molecular weight to a desired level.

The role of charge-transfer complexes in alternating copolymerization is not entirely clear but this theory does account for the rapid copolymerization of monomer pairs which individually do not polymerize under radical initiation. Bartlett and Nozaki [JACS, 68, 1495 (1946)] introduced the theory of polymerization of complexes. Seiner and Litt [Macromol. 4, No. 3, 308 (1971)] supported this theory and proposed that changing solvents and monomer concentrations would charge the equilibrium constant for complex formation, the copolymer reactivity ratios, and the dielectric constant of the entire solution.

While there are several known techniques for controlling the molecular weight of radical polymers, it has been observed that the alternating copolymerizations do not behave as typical radical addition polymerizations. The common control techniques have some effect but the magnitude is often not of the expected order. Typical techniques for molecular weight modification well known to polymer chemists include: changing the polymerization temperature, initiator concentration, and adding chain transfer agents. The effective use of chain transfer agents to lower the molecular weight of an alternating copolymer is exemplified by Johnson, U.S. Pat. No. 2,913,437. This method, however, yields a slurry of precipitated polymer and would not be very useful if the application for the polymer called for a solution of dissolved copolymer. In going the other direction, that of obtaining high molecular weight copolymers, Hibbard, U.S. Pat. No. 2,872,436 used methylene chloride as the polymerization solvent and Verdol and Thienot, U.S. Pat. No. 3,423,355, used low temperatures and low levels of very reactive alkyl peroxy dicarbonate initiators and a ketone solvent.

The above methods for altering the molecular weight of alternating copolymers are effective but the necessary conditions are quite restrictive. The process of Hibbard is not desirable since it yields only high molecular weight copolymers and the process of Johnson presents a fire hazard in handling the large amounts of aromatic chain transfer agents.

SUMMARY OF THE INVENTION

It has now been found that the molecular weight of charge-transfer copolymers as evidenced by the aqueous solution viscosity of neutralized alternating copolymers of an olefinic monomer and an unsaturated dicarboxylic acid anhydride can be controlled by carrying out the copolymerization reaction under autogenous pressure with a free radical initiator at a temperature in the range from 0° to 150°C. in a primary solvent selected from benzene, toluene, acetone or methylene chloride to which has been added an effective amount of a different secondary solvent selected from lower alkanols, dimethyl formamide, water or methylene chloride.

More specifically, it has been found that when the primary solvent used in the copolymerization process is benzene, toluene, methylene chloride or acetone, the solution viscosity and therefore the molecular weight is lowered when an effective amount of a secondary solvent such as lower alkanols, dimethyl formamide, or water is added thereto.

When benzene, toluene, or acetone is used as the primary solvent, the molecular weight or the solution viscosity is raised with the addition of an effective amount of methylene chloride as the secondary solvent.

Methylene chloride appears in both the list of primary solvents and secondary solvents since it tends to produce a higher molecular weight product when used alone (U.S. Pat. No. 2,872,436) and it has now been discovered that this effect is still apparent when methylene chloride is a minor portion of the total polymerization solvent.

The low molecular weight copolymers produced by this invention, when the charge transfer comonomers are olefins and unsaturated dicarboxylic acid anhydrides may be neutralized to polyelectrolytes and are useful as suspending agents or detergent builders. On the other hand, the high molecular weight copolyelectrolytes are useful as flocculants and thickeners.

The present invention is an improvement over the known polymerization techniques since the molecular weight can be varied to suit the needs of the final product even while holding the temperature and initiator level constant. This is an important consideration in large scale production runs where heat transfer problems are important considerations. Furthermore, while each primary solvent will provide a range of molecular weights or viscosities for the copolymers using the above known techniques, the present invention provides a method whereby these ranges can be significantly extended. Thus, the present invention is a versatile process for controlling molecular weight of the copolymers which can be adapted to many commercial requirements and useful with a variety of different solvents.

DETAILED DESCRIPTION

The alternating copolymers are prepared by reacting an electron-rich olefinically unsaturated monomer with an electron-deficient comonomer capable of forming in solution a charge-transfer complex. The polymerization is done under autogenous pressure in the presence of a catalytic amount of an organic free radical compound in a diluent consisting of a primary solvent and a minor amount of a different secondary solvent which is effective to vary the molecular weight of the polymer.

Suitable primary solvents are benzene, toluene, acetone, or methylene chloride.

Suitable secondary solvents that can be used are lower alkanols such as methanol, ethanol, propanol, etc., dimethyl formamide, water, and methylene chloride.

Suitable electron rich monomers that can be used are ethylene, propylene, n-butylene, and isobutylene and vinyl ethers.

Suitable electron deficient monomers are; olefinically unsaturated dicarboxylic acids or their acid anhydrides such as maleic, fumaric, mesaconic, citraconic, itaconic, and glutaconic acids, together with their chloro, alkyl and aryl derivatives and non-olefinic monomers like sulfur dioxide and carbon monoxide. In the case in which isobutylene and maleic anhydride are the comonomers, the polymer is removed from the reactor and finely divided in a blender with methanol. The slurry is then filtered and dried.

In order to form useful polyelectrolytes, the dry powder is neutralized with a base. Suitable bases are aqueous ammonia, gaseous ammonia, alkali hydroxides, and alkyl amines such as methylamine, diethylamine, ethylamine and the like.

The actual mechanism by which molecular weight control is obtained in the process of this invention is not known but it obviously cannot be simple chain transfer activity since none of the secondary solvents are recognized chain transfer agents for non-aqueous radical polymerization. The active, polymerizing species in alternating polymerizations of this type are believed to be charge transfer complexes of the electron rich comonomer with the electron poor comonomer. Formation of the complex enlarges the electron cloud around the monomer pair and thus lowers the activation energy for radical addition to the electron cloud. The induced dipole in each monomer may also cause some ordering or aligning of the activated complexes making them ready for zipping up when an initiator radical adds to one end of a complex aggregation. It is proposed that the secondary solvents, by virtue of their particular polarity or solvating power are altering the orientation and concentration of the charge transfer complexes so that when polymerization occurs the obtained degree of polymerization and hence molecular weight and solution viscosity are different from that obtained without the presence of the secondary diluent. When too much of the polar secondary diluents is present, the overall polymer yield decreases even though the concentration of initiator is high. The polar secondary diluents may be shielding the complexes from the approaching radicals while concurrently separating the complexes from each other or they may be decreasing the actual concentration of complexes by solvation of the free monomers. If they were reacting preferentially with the initiator, the system would be starved for initiator and conversion would drop but the copolymer which did form would be very high molecular weight. This is not observed for both conversion and molecular weight decrease with high levels of polar secondary diluent. The relatively non-polar secondary diluent, methylene chloride, appears to increase the liklihood of activated complexes zipping up to high molecular weight. This behaviour is strange as pointed out by Hibbard in U.S. Pat. No. 2,872,436. Carbon tetrachloride with 2 more chlorine atoms than methylene chloride and chloroform with just one more chlorine are both recognized chain transfer agents.

The invention is further illustrated but not limited by the following examples.

EXAMPLES 1–17

Several 350 ml. glass reactors (citrate bottles) were charged with 12.25 gms. (0.125 mole) of maleic anhydride and 100 ml. of various solvents. Oxygen was removed by a nitrogen purge below the surface of the solutions. The reactors were cooled in dry ice to −20°C. and varying amounts of free radical initiators were added. The reactors were then charged with 15 ml. (0.16 mole) condensed isobutylene and sealed. The reactors were then transferred to heavy brass cages, warmed to room temperature, shaken, and placed in a 60°C. water bath for varying times.

The reactors were cooled, vented and the contents masticated with methanol in a laboratory blender. The product was then filtered and dried at 50°C. in a vacuum oven.

The recovered white powder was then neutralized by exposing it to 10 psig gaseous ammonia in a steel bomb at 25°C. for up to 18 hours, during which time the temperature inside the bomb usually rose to 45°C. and then returned to 25°C.

In order to determine the viscosity of the polymer and hence its relative molecular weight, 5 grams of the neutralized polymer were dissolved in 95 grams of deionized water and an Ostwald viscometer was used to measure the viscosity at 25°C. The results are shown in Tables I–IV.

TABLE I

Toluene as a Primary Diluent

| Example | Secondary Diluent Vol.% based on Toluene | % Initiator Based on M.A. | Temp. °C. | Reaction Time in Hours | % Theoretical Yield | Viscosity CPS |
|---|---|---|---|---|---|---|
| Control 1 | none | 0.9 V | 60 | 21 | 97 | 33.3 |
| Control 2 | none | 1.0 L | 50 | 17 | 94 | 35.1 |
| 1 | methylene chloride 20% | 0.9 V | 60 | 18 | 80 | 49.7 |
| 2 | methanol 10% | 1.0 L | 50 | 7 | 33 | 11.8 |
| 3 | water 1% | 1.0 L | 50 | 17 | 75 | 29.2 |
| 4 | water 2% | 1.0 L | 50 | 7 | 52.8 | 24 |
| 5 | water 3% | 1.0 L | 50 | 17 | 22 | 8.8 |

M.A. = maleic anhydride
V = azobisisobutyronitrile
L = t-butyl peroxypivalate

Table I shows that the use of methylene chloride at a level of 20% by volume of toluene effectively gives a 49% increase in the solution viscosity of the neutralized alternating copolymer. The decrease in viscosities and yields obtained with methanol and water indicate that the secondary diluents are not functioning as typical chain transfer agents since the mechanism of chain transfer does not stop the production of polymer chains but instead limits the size of the chains produced.

TABLE II

Methylene Chloride as Primary Diluent

| Example | Secondary Diluent Vol% based on MeCl | % Initiator Based on M.A. | Temp. °C. | Reaction Time in Hours | % Theoretical Yield | Viscosity CPS |
|---|---|---|---|---|---|---|
| Control | none | 1-L | 50 | 7.5 | 100 | 90.8 |
| 6 | dimethylformamide (DMF)-10 | 1-L | 50 | 7.5 | 90 | 7.16 |
| 7 | DMF-20 | 1-L | 50 | 7.5 | 76 | 5.05 |

M.A. = maleic anhydride
L = t-butylperoxypivalate

TABLE III

Benzene as Primary Diluent

| Example | Secondary Diluent Vol.% Based on Benzene | % Initiator Based on M.A. | Temp. °C. | Reaction Time in Hours | % Theoretical Yield | Viscosity CPS |
|---|---|---|---|---|---|---|
| Control | none | 2-V | 60 | 17.5 | 100 | 25.2 |
| 8 | DMF-5 | 2-V | 60 | 17.5 | 98.7 | 4.95 |
| 9 | DMF-10 | 2-V | 60 | 17.5 | 100 | 3.75 |
| 100 | DMF-15 | 2-V | 60 | 17.5 | 94.5 | 3.27 |

V = azobisisobutyronitrile

TABLE IV

Acetone as Primary Diluent

| Example | Secondary Diluent Vol.% based on Acetone | % Initiator Based on M.A. | Temp. °C. | Reaction Time in Hours | % Theoretical Yield | Viscosity CPS |
|---|---|---|---|---|---|---|
| Control 1 | none | 1.3 B / 1.7 P | 50 | 21 | 100 | 84.6 |
| Control 2 | none | 1.0 L | 50 | 23 | 98 | 77.9 |
| 11 | dimethylformamide (DMF)-4 | 1.3 B / 1.7 P | 50 | 21 | 100 | 14.3 |
| 12 | DMF-8 | 1.3 B / 1.7 P | 50 | 21 | 49.4 | 9.3 |
| 13 | DMF-12 | 1.3 B / 1.7 P | 50 | 21 | 69 | 5.2 |
| 14 | DMF-16 | 1.3 B / 1.7 P | 50 | 21 | 79.5 | 4.56 |
| 15 | DMF-20 | 1.3 B / 1.7 P | 50 | 21 | 61.4 | 4.42 |
| 16 | methanol-10 | 1.0 L | 50 | 23 | 97 | 64.1 |
| 17 | water-2 | 1.0 L | 50 | 23 | 100 | 50.7 |

M.A. = maleic anhydride
L = t-butylperoxy pivalate
V = azobisisobutyronitrile
B = benzoyl peroxide
P = p-toluene sulfonic acid In order to illustrate the relationship between the peak molecular weight of the maleic anhydride/isobutylene copolymers, the diluents and the copolymer viscosity (5% aqueous solutions of the ammoniated polymer at 25°C.), Table V is presented.

TABLE V

| Viscosity in C.P.S. | Diluents (% by volume) | Peak Mol. Wt. |
|---|---|---|
| 2.2 | 25% DMF in Benzene | $0.75 \times 10^6$ |
| 5.0 | 5% DMF in Benzene | $1.4 \times 10^6$ |
| 33.3 | 100% Toluene | $4.5 \times 10^6$ |
| 49.0 | 20% M.C. in Toluene | $5.7 \times 10^6$ |
| 637.0 | 40% Benzene in M.C. | $14.0 \times 10^6$ |

M.C. = methylene chloride
DMF = dimethylformamide

I claim:

1. In a process for the preparation of an alternating copolymer of an olefinic monomer having 2–4 carbon atoms and a monomer selected from an olefinically unsaturated dicarboxylic acid or the anhydride thereof which comprises polymerizing a mixture of the monomers under autogenous pressure with a free radical initiator at a temperature in the range of 0° to 150°C in a solution thereof in a primary solvent consisting of benzene, toluene, acetone, or methylene chloride, the improvement which comprises adding to said solvent solution before the copolymerization reaction, an effective amount of a different secondary solvent consisting of lower alkanols, dimethyl formamide, or water to lower the molecular weight of the resulting copolymer.

2. The process as set forth in claim 1 wherein the olefinic monomer is isobutylene.

3. The process as set forth in claim 1 wherein the dicarboxylic acid anhydride is maleic anhydride.

* * * * *